US008422108B2

(12) United States Patent
Miles

(10) Patent No.: US 8,422,108 B2
(45) Date of Patent: *Apr. 16, 2013

(54) METHOD AND DEVICE FOR MODULATING LIGHT WITH OPTICAL COMPENSATION

(75) Inventor: Mark W. Miles, San Francisco, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/642,750

(22) Filed: Dec. 18, 2009

(65) Prior Publication Data

US 2010/0214642 A1  Aug. 26, 2010

Related U.S. Application Data

(60) Continuation of application No. 11/433,294, filed on May 12, 2006, now Pat. No. 7,907,319, which is a continuation of application No. 11/056,571, filed on Feb. 11, 2005, now Pat. No. 7,379,227, which is a continuation of application No. 09/966,843, filed on Sep. 28, 2001, now Pat. No. 6,867,896, which is a division of application No. 09/056,975, filed on Apr. 8, 1998, now Pat. No. 6,674,562, which is a continuation-in-part of application No. 08/769,947, filed on Dec. 19, 1996, now abandoned, and a continuation-in-part of application No. 08/554,630, filed on Nov. 6, 1995, now abandoned.

(51) Int. Cl.
*G02B 26/12* (2006.01)
*G02F 1/29* (2006.01)

(52) U.S. Cl.
USPC .......... 359/224.1; 359/223.1; 359/224.2; 359/291; 359/315; 359/290; 359/292; 359/295; 359/298; 359/318; 345/48; 345/84; 345/85; 345/90; 345/108; 348/750; 348/770; 348/771

(58) Field of Classification Search .......... 359/223, 359/224, 290–292, 295, 298, 315, 318; 345/48, 345/84, 85, 90, 108; 348/750, 770, 771
See application file for complete search history.

(56) References Cited

U.S. PATENT DOCUMENTS 2,518,647 A   8/1950  Teeple et al.
2,588,792 A   3/1952  Barkley
(Continued)

FOREIGN PATENT DOCUMENTS

CN   1213861     4/1999
DE   196 22 748  12/1997
(Continued)

OTHER PUBLICATIONS

Nakagawa et al., "Wide-Field-of-View Narrow-Band Spectral Filters Based on Photonic Crystal Nanocavities", Optical Society of America, Optics Letters, vol. 27, No. 3, pp. 191-193, 2002.

(Continued)

*Primary Examiner* — Evelyn A. Lester
(74) *Attorney, Agent, or Firm* — Knobbe Martens Olson & Bear LLP

(57) ABSTRACT

An interferometric modulator (Imod) cavity has a reflector and an induced absorber. A direct view reflective flat panel display may include an array of the modulators. Adjacent spacers of different thicknesses are fabricated on a substrate by a lift-off technique used to pattern the spacers which are deposited separately, each deposition providing a different thickness of spacer. Or a patterned photoresist may be used to allow for an etching process to selectively etch back the thickness of a spacer which was deposited in a single deposition. A full-color static graphical image may be formed of combined patterns of interferometric modulator cavities. Each cavity includes a reflector, and an induced absorber, the induced absorber including a spacer having a thickness that defines a color associated with the cavity.

14 Claims, 8 Drawing Sheets

U.S. PATENT DOCUMENTS

| | | | |
|---|---|---|---|
| 2,677,714 A | 5/1954 | Max | |
| 3,247,392 A | 4/1966 | Thelen | |
| 3,656,836 A | 4/1972 | de Cremoux et al. | |
| 3,679,313 A | 7/1972 | Rosenberg | |
| 4,158,718 A | 6/1979 | Kehl et al. | |
| 4,200,472 A | 4/1980 | Chappell | |
| 4,282,862 A | 8/1981 | Soleau | |
| 4,377,324 A | 3/1983 | Durand | |
| 4,400,577 A | 8/1983 | Spear | |
| 4,403,248 A | 9/1983 | Te Velde | |
| 4,441,789 A | 4/1984 | Pohlack | |
| 4,441,791 A | 4/1984 | Hornbeck | |
| 4,459,182 A | 7/1984 | Te Velde | |
| 4,497,974 A | 2/1985 | Deckman | |
| 4,566,935 A | 1/1986 | Hornbeck | |
| 4,596,992 A | 6/1986 | Hornbeck | |
| 4,615,595 A | 10/1986 | Hornbeck | |
| 4,633,031 A | 12/1986 | Todorof | |
| 4,662,746 A | 5/1987 | Hornbeck | |
| 4,688,068 A | 8/1987 | Chaffin et al. | |
| 4,705,361 A | 11/1987 | Frazier et al. | |
| 4,710,732 A | 12/1987 | Hornbeck | |
| 4,786,128 A | 11/1988 | Birnbach | |
| 4,822,993 A | 4/1989 | Dillon et al. | |
| 4,825,262 A * | 4/1989 | Mallinson | 356/454 |
| 4,859,060 A | 8/1989 | Katagiri | |
| 4,982,184 A | 1/1991 | Kirkwood | |
| 4,985,312 A | 1/1991 | Furuya et al. | |
| 5,028,939 A | 7/1991 | Hornbeck et al. | |
| 5,061,049 A | 10/1991 | Hornbeck | |
| 5,151,585 A | 9/1992 | Siebert | |
| 5,252,142 A | 10/1993 | Matsuyama et al. | |
| 5,341,242 A | 8/1994 | Gilboa et al. | |
| 5,356,488 A | 10/1994 | Hezel | |
| 5,401,983 A | 3/1995 | Jokerst | |
| 5,500,761 A | 3/1996 | Goossen et al. | |
| 5,544,268 A | 8/1996 | Bischel et al. | |
| 5,550,373 A | 8/1996 | Cole | |
| 5,559,358 A | 9/1996 | Burns et al. | |
| 5,569,332 A | 10/1996 | Glatfelter et al. | |
| 5,578,140 A | 11/1996 | Yogev et al. | |
| 5,578,976 A | 11/1996 | Yao | |
| 5,654,819 A | 8/1997 | Goossen | |
| 5,710,656 A | 1/1998 | Goossen | |
| 5,720,827 A | 2/1998 | Simmons | |
| 5,745,281 A | 4/1998 | Yi | |
| 5,757,536 A | 5/1998 | Ricco et al. | |
| 5,782,995 A | 7/1998 | Nanya et al. | |
| 5,818,095 A | 10/1998 | Sampsell | |
| 5,835,255 A | 11/1998 | Miles | |
| 5,853,310 A | 12/1998 | Nishimura | |
| 5,886,688 A | 3/1999 | Fifield | |
| 5,907,426 A | 5/1999 | Kato et al. | |
| 5,914,803 A | 6/1999 | Hwang et al. | |
| 5,914,804 A | 6/1999 | Goossen | |
| 5,920,421 A | 7/1999 | Choi | |
| 5,986,796 A | 11/1999 | Miles | |
| 6,021,007 A | 2/2000 | Murtha | |
| 6,031,653 A | 2/2000 | Wang | |
| 6,038,056 A | 3/2000 | Florence et al. | |
| 6,040,937 A | 3/2000 | Miles | |
| 6,046,840 A | 4/2000 | Huibers | |
| 6,055,090 A * | 4/2000 | Miles | 359/291 |
| 6,077,722 A | 6/2000 | Jansen et al. | |
| 6,088,102 A | 7/2000 | Manhart | |
| 6,094,285 A | 7/2000 | Wickham et al. | |
| 6,111,276 A | 8/2000 | Mauk | |
| 6,166,319 A | 12/2000 | Matsuyama | |
| 6,229,084 B1 | 5/2001 | Katsu | |
| 6,300,558 B1 | 10/2001 | Takamoto | |
| 6,310,729 B1 | 10/2001 | Tsukamoto | |
| 6,323,923 B1 | 11/2001 | Hoshino | |
| 6,356,378 B1 | 3/2002 | Huibers | |
| 6,381,022 B1 | 4/2002 | Zavracky | |
| 6,447,126 B1 | 9/2002 | Hornbeck | |
| 6,650,455 B2 | 11/2003 | Miles | |
| 6,674,562 B1 | 1/2004 | Miles | |
| 6,867,896 B2 | 3/2005 | Miles | |
| 6,882,458 B2 | 4/2005 | Lin et al. | |
| 6,912,022 B2 | 6/2005 | Lin | |
| 6,958,847 B2 | 10/2005 | Lin | |
| 6,995,890 B2 | 2/2006 | Lin et al. | |
| 6,999,225 B2 | 2/2006 | Lin et al. | |
| 6,999,236 B2 | 2/2006 | Lin et al. | |
| 7,016,095 B2 | 3/2006 | Lin | |
| 7,038,752 B2 | 5/2006 | Lin | |
| 7,042,643 B2 | 5/2006 | Miles | |
| 7,110,158 B2 | 9/2006 | Miles | |
| 7,123,216 B1 | 10/2006 | Miles | |
| 7,126,738 B2 | 10/2006 | Miles | |
| 7,138,984 B1 | 11/2006 | Miles | |
| 7,187,489 B2 | 3/2007 | Miles | |
| 7,304,784 B2 | 12/2007 | Chui | |
| 7,327,510 B2 | 2/2008 | Cummings et al. | |
| 7,342,705 B2 | 3/2008 | Chui et al. | |
| 7,342,709 B2 | 3/2008 | Lin | |
| 7,369,294 B2 | 5/2008 | Gally | |
| 7,385,748 B2 | 6/2008 | Miles | |
| 7,417,735 B2 | 8/2008 | Cummings | |
| 7,450,295 B2 | 11/2008 | Tung | |
| 7,463,421 B2 | 12/2008 | Miles | |
| 7,508,571 B2 | 3/2009 | Gally | |
| 7,561,323 B2 | 7/2009 | Gally | |
| 7,564,612 B2 | 7/2009 | Chui | |
| 7,595,926 B2 | 9/2009 | Sasagawa et al. | |
| 7,603,001 B2 | 10/2009 | Wang | |
| 7,605,969 B2 | 10/2009 | Miles | |
| 7,630,123 B2 | 12/2009 | Kothari | |
| 7,643,203 B2 | 1/2010 | Gousev et al. | |
| 7,653,371 B2 | 1/2010 | Floyd | |
| 7,710,632 B2 | 5/2010 | Cummings | |
| 7,710,636 B2 | 5/2010 | Chui | |
| 7,719,500 B2 | 5/2010 | Chui | |
| 7,750,886 B2 | 7/2010 | Sampsell | |
| 7,807,488 B2 | 10/2010 | Gally | |
| 7,855,824 B2 | 12/2010 | Gally | |
| 7,898,521 B2 | 3/2011 | Gally | |
| 7,898,723 B2 | 3/2011 | Khazeni | |
| 7,907,319 B2 * | 3/2011 | Miles | 345/108 |
| 8,004,504 B2 | 8/2011 | Cummings et al. | |
| 8,058,549 B2 | 11/2011 | Kothari | |
| 2002/0050286 A1 | 5/2002 | Kubato | |
| 2002/0075555 A1 | 6/2002 | Miles | |
| 2006/0066541 A1 | 3/2006 | Gally | |
| 2006/0066935 A1 | 3/2006 | Cummings | |
| 2006/0077153 A1 | 4/2006 | Cummings | |
| 2006/0274400 A1 * | 12/2006 | Miles | 359/291 |
| 2007/0092728 A1 | 4/2007 | Ouderkirk et al. | |
| 2007/0132843 A1 | 6/2007 | Miles | |
| 2007/0247704 A1 | 10/2007 | Mignard | |
| 2009/0059346 A1 | 3/2009 | Xu | |
| 2009/0078316 A1 | 3/2009 | Khazeni | |
| 2009/0101192 A1 | 4/2009 | Kothari | |
| 2009/0103161 A1 | 4/2009 | Kothari | |
| 2009/0103165 A1 | 4/2009 | Kothari | |
| 2009/0151771 A1 | 6/2009 | Kothari | |
| 2009/0159123 A1 | 6/2009 | Kothari | |
| 2009/0219604 A1 | 9/2009 | Miles | |
| 2009/0242024 A1 | 10/2009 | Kothari | |
| 2009/0251761 A1 | 10/2009 | Khazeni | |
| 2009/0293955 A1 | 12/2009 | Kothari | |
| 2010/0096006 A1 | 4/2010 | Griffiths | |
| 2010/0096011 A1 | 4/2010 | Griffiths | |
| 2010/0165443 A1 | 7/2010 | Chui | |
| 2010/0236624 A1 | 9/2010 | Khazeni | |
| 2010/0245975 A1 | 9/2010 | Cummings | |
| 2010/0284055 A1 | 11/2010 | Kothari | |
| 2012/0044563 A1 | 2/2012 | Cummings | |
| 2012/0182595 A1 | 7/2012 | Miles | |

FOREIGN PATENT DOCUMENTS

| | | |
|---|---|---|
| EP | 0 112 646 | 7/1984 |
| EP | 0 223 136 A | 5/1987 |
| EP | 0 622 856 | 11/1994 |
| EP | 0 667 548 | 8/1995 |
| EP | 0 786 911 | 7/1997 |
| EP | 0 843 364 | 5/1998 |

| | | |
|---|---|---|
| EP | 0 879 991 | 11/1998 |
| EP | 2 012 167 | 1/2009 |
| EP | 2 040 304 A1 | 3/2009 |
| EP | 2 051 124 A | 4/2009 |
| JP | 56 088111 | 7/1981 |
| JP | 59-104185 | 6/1984 |
| JP | 60 147718 | 8/1985 |
| JP | 61 093678 | 5/1986 |
| JP | 02 003993 | 1/1990 |
| JP | 02-068513 | 3/1990 |
| JP | 02-151079 A | 6/1990 |
| JP | 02 237172 | 9/1990 |
| JP | 03 030419 | 2/1991 |
| JP | 03-199920 | 8/1991 |
| JP | 04 127580 | 4/1992 |
| JP | 04 190323 | 7/1992 |
| JP | 04-238321 A | 8/1992 |
| JP | 05 259495 | 10/1993 |
| JP | 06 021494 | 1/1994 |
| JP | 08 018990 | 1/1996 |
| JP | 08 051230 A | 2/1996 |
| JP | 08 094992 | 4/1996 |
| JP | 09 068722 | 3/1997 |
| JP | 09 189869 | 7/1997 |
| JP | 09 275220 | 10/1997 |
| JP | 10 500224 | 1/1998 |
| JP | 11 211999 | 8/1999 |
| JP | 11 295725 | 10/1999 |
| JP | 11-295726 A | 10/1999 |
| JP | 2000 500245 | 1/2000 |
| WO | WO 94/28452 A1 | 12/1994 |
| WO | WO 95/30924 | 11/1995 |
| WO | WO 96/38319 | 12/1996 |
| WO | WO 97/17628 | 5/1997 |
| WO | WO 97/44707 A | 11/1997 |
| WO | WO 97/46908 | 12/1997 |
| WO | WO 03/007049 | 1/2003 |
| WO | WO 2006/036495 | 4/2006 |
| WO | WO 2008/045224 | 4/2008 |
| WO | WO 2009/042497 | 4/2009 |

OTHER PUBLICATIONS

International Search Report in PCT/US96/17731, (International Publication No. WO 97/17628 A1) dated Jan. 28, 1997.
Aratani K. et al. "Surface Micromachined Tuneable Interferometer Array," Sensors and Actuators A, vol. A43, No. 1/3, pp. 17-23, May 1994.
Miles, M.W., "A Mems Based Interferometric Modulator (IMOD) for Display Applications," Proceedings of Sensors Expo, pp. 281-284, Oct. 21, 1997, XP009058455.
International Search Report and Written Opinion in PCT/US2005/032020 (International Publication No. WO 2006/036495) dated Dec. 30, 2005.
International Preliminary Report on Patentability and Written Opinion in PCT/US/2005/032020 dated Apr. 5, 2007.
Official Communication in Japanese Application No. 9-518276, dated Apr. 11, 2006.
English Translation of Official Communication in Japanese Application No. 9-518276, dated Feb. 27, 2007.
Official Communication in Japanese Application No. 9-518276, dated Apr. 14, 2009.
International Search Report in PCT/US96/17731 (International Publication No. WO 97/17628 A1), dated Jan. 28, 1997.
Official Communication in Japanese Application No. 2009-236776, dated Mar. 23, 2011.
Non-Final Rejection in U.S. Appl. No. 08/688,710, dated Dec. 2, 1996.
Response after Non-Final Action in U.S. Appl. No. 08/688,710, dated Jun. 2, 1997.
Final Rejection in U.S. Appl. No. 08/688,710, dated Sep. 16, 1997.
Amendment after Final Rejection in U.S. Appl. No. 08/688,710, dated Dec. 19, 1997.
Notice of Appeal from the Examiner to the Board of Patents Appeals and Interferences in U.S. Appl. No. 08/688,710, dated Mar. 16, 1998.
Advisory Action in U.S. Appl. No. 08/688,710, dated Apr. 7, 1998.
Non-Final Rejection in U.S. Appl. No. 08/688,710, dated Jun. 25, 1998.
Response after Non-Final Action in U.S. Appl. No. 08/688,710, dated Dec. 23, 1998.
Notice of Allowance in U.S. Appl. No. 08/688,710, dated Mar. 5, 1999.
Amendment after Notice of Allowance (Rule 312) in U.S. Appl. No. 08/688,710, dated Jun. 2, 1999.
Preliminary Amendment in U.S. Appl. No. 08/688,710, dated Jun. 9, 1999.
Response to 312 Amendment (PTO-271) in U.S. Appl. No. 08/688,710, dated Jun. 17, 1999.
Notice of Allowance in U.S. Appl. No. 08/688,710, dated Sep. 23, 1999.
Notice of Allowance in U.S. Appl. No. 09/238,340, dated May 19, 1999.
Amendment after Notice of Allowance (Rule 312) in U.S. Appl. No. 09/238,340, dated Jun. 2, 1999.
Preliminary Amendment in U.S. Appl. No. 09/238,340, dated Jun. 9, 1999.
Response to Amendment under Rule 312 in U.S. Appl. No. 09/238,340, dated Jun. 17, 1999.
Notice of Allowability in U.S. Appl. No. 09/238,340, dated Sep. 28, 1999.
Notice of Allowance and Issue Fee Due in U.S. Appl. No. 09/238,340, dated Oct. 14, 1999.
Office Action in U.S. Appl. No. 12/360,005, dated Jan. 7, 2011.
Amendment in U.S. Appl. No. 12/360,005, dated Mar. 7, 2011.
Notice of Allowance in U.S. Appl. No. 12/360,005, dated Mar. 25, 2011.
Office Action in U.S. Appl. No. 11/155,939, dated Mar. 12, 2009.
Amendment in U.S. Appl. No. 11/155,939, dated Jun. 12, 2009.
Office Action in U.S. Appl. No. 11/155,939, dated Sep. 25, 2009.
Request for Continued Examination and Amendment in U.S. Appl. No. 11/155,939, dated Jan. 25, 2010.
Office Action in U.S. Appl. No. 11/155,939, dated Feb. 18, 2010.
Response to Office Action in U.S. Appl. No. 11/155,939, dated May 18, 2010.
Office Action in U.S. Appl. No. 11/155,939, dated Aug. 5, 2010.
Request for Continued Examination, Amendment, and Summary of Interview in U.S. Appl. No. 11/155,939, dated Nov. 5, 2010.
Notice of Allowance in U.S. Appl. No. 11/155,939, dated Dec. 8, 2010.
Request for Continued Examination and Information Disclosure Statement in U.S. Appl. No. 11/155,939, dated Mar. 7, 2011.
Amendment in U.S. Appl. No. 11/155,939, dated Mar. 14, 2011.
Supplemental Amendment and Information Disclosure Statement in U.S. Appl. No. 11/155,939, dated Mar. 15, 2011.
Notice of Allowance in U.S. Appl. No. 11/155,939, dated Mar. 22, 2011.
Supplemental Notice of Allowance in U.S. Appl. No. 11/155,939, dated Mar. 31, 2011.
Comments on Statement of Reasons for Allowance in U.S. Appl. No. 11/155,939, dated Jun. 17, 2011.
Official Communication in Chinese Patent Application No. 200580032119.6 dated Jun. 6, 2008.
Official Communication in Chinese Patent Application No. 200580032119.6 dated Feb. 6, 2009.
Official Communication in Chinese Patent Application No. 200580032119.6 dated Aug. 7, 2009.
Official Communication in Chinese Patent Application No. 200580032119.6 dated Mar. 30, 2010.
Substantive Examination Report in Malaysian Application No. PI 20054361, dated Nov. 28, 2008.
Issue Fee, Amendment After Allowance Under 37 C.F.R. § 1.312, and Information Disclosure Statement in U.S. Appl. No. 11/433,294, dated Jan. 14, 2011.
Response to Rule 312 Communication in U.S. Appl. No. 11/433,294, dated Jan. 26, 2011.
Supplemental Amendment in U.S. Appl. No. 11/949,699, dated Jan. 11, 2011.
Preliminary Amendment in U.S. Appl. No. 12/730,112, dated Jun. 8, 2010.

RCE and Amendment in U.S. Appl. No. 12/360,005 dated Jun. 22, 2011.
Notice of Allowance in U.S. Appl. No. 12/360,005 dated Jul. 13, 2011.
RCE and Amendment in U.S. Appl. No. 12/360,005 dated Oct. 11, 2011.
Notice of Allowance in U.S. Appl. No. 12/360,005 dated Dec. 28, 2011.
Official Communication in Chinese Application No. 200880108464.7 dated Jul. 20, 2011.
Amm et al., "5.2: Grating Light Valve Technology: Update and Novel Applications", presented at Society for Information Display Symposium, May 19, 1998.
US 8,169,687, 05/2012, Miles (withdrawn)

* cited by examiner

METHOD AND DEVICE FOR MODULATING LIGHT WITH OPTICAL COMPENSATION

CROSS-REFERENCE TO RELATED APPLICATIONS

This application is a continuation of co-pending U.S. patent application Ser. No. 11/433,294, filed May 12, 2006 (now US 2006/0274400 A1, wherein the application is currently allowed, but has not issued), which is a continuation of U.S. patent application Ser. No. 11/056,571, filed Feb. 11, 2005 (now U.S. Pat. No. 7,379,227), which is a continuation of U.S. patent application Ser. No. 09/966,843, filed Sep. 28, 2001 (now U.S. Pat. No. 6,867,896), which is a divisional of U.S. patent application Ser. No. 09/056,975, filed Apr. 8, 1998 (now U.S. Pat. No. 6,674,562), which is a continuation-in-part of both (1) U.S. patent application Ser. No. 08/769,947, filed Dec. 19, 1996 (now abandoned) and (2) U.S. patent application Ser. No. 08/554,630, filed Nov. 6, 1995 (now abandoned). The disclosures of these prior applications are considered part of, and are incorporated by reference into, the disclosure of this application. Also incorporated by reference herein is U.S. patent application Ser. No. 08/238,750, filed May 5, 1994 (now U.S. Pat. No. 5,835,255).

BACKGROUND

This invention relates to visible spectrum (including ultraviolet and infrared) modulator arrays.

The parent application describes two kinds of structures whose impedance, the reciprocal of admittance, can be actively modified so that they can modulate light. One scheme is a deformable cavity whose optical properties can be altered by electrostatic deformation of one of the cavity walls. The composition and thickness of these walls, which consist of layers of dielectric, semiconductor, or metallic films, allows for a variety of modulator designs exhibiting different optical responses to applied voltages.

One such design includes a filter described as a hybrid filter which has a narrow bandpass filter and an induced absorber. When the wall associated with the hybrid filter is brought into contact with a reflector, incident light of a certain range is absorbed. This occurs because the induced absorber matches the impedance of the reflector to that of the incident medium for the range of frequencies passed by the narrow-band filter.

SUMMARY

This invention eliminates the need for the narrow-band filter and provides a much broader absorption range.

The invention modulates light by electrostatically varying the spacing of a cavity comprising two walls, one of which is a reflector and the other is the induced absorber. The cavity is fabricated on an optically smooth substrate, i.e., sufficiently smooth to allow for the manifestation of interference effects.

Thus, in general, in one aspect the invention features an interferometric modulator cavity having a reflector and an induced absorber.

Implementations of the invention may include one or more of the following features. The reflector may include films of metal, dielectric, semiconductor, or a combination of them. The induced absorber may include a sandwich of an absorber between two matching layers. One of the matching layers may reside at the boundary of the absorber with an incident medium and the other matching layer may reside at the boundary of the absorber with the reflector. At least one of the matching layers may include a film of metal. At least one of the matching layers may include a dielectric film, or a semiconducting film, or a combination of at least two of a metal film, a dielectric film, and a semiconducting film. The absorber may include a high loss film such as a metal, or a high loss film such as a semiconductor, or a combination of a metal and semiconducting film. There may also be a substrate which includes a transparent incident medium. The induced absorber and/or the reflector may reside on the substrate. The substrate may be transparent, in which case it could also act as the incident medium, or opaque. The spacer may be air or some other pliant medium (e.g., liquid or plastic) which would allow the thickness of the gap to be altered.

In general, in another aspect, the invention features a direct view reflective flat panel display comprising an array of interferometric modulators.

Implementations of the invention may include one or more of the following. The array may include sets of the interferometric modulators, the respective sets being arranged to switch between different pairs of reflective states. The array may include a single set of interferometric modulators, the set being arranged to be driven in an analog fashion to reflect any particular color. The brightness of each of the modulators is controlled by pulse width modulation, or by spatial dithering, or by a combination of the two. The array may be sealed by a backplane. The backplane may include a monolithic element. The backplane may be attached. The backplane may support electrodes which modify the electromechanical response of the pixels. Each of the modulators may be actuated by electrostatic forces or by piezoelectric forces or by magnetic forces. The display may be used in a projection system. An optical compensation mechanism may be used to mitigate or eliminate a shift in color with respect to viewing angle or to provide supplemental frontlighting or to mitigate or eliminate a shift in color with respect to viewing angle. The substrate may be an integrated circuit.

In general, in another aspect, the invention features a process for fabricating adjacent spacers of different thicknesses on a substrate in which a lift-off technique is used to pattern the spacers which are deposited separately, each deposition providing a different thickness of spacer. Or a patterned photoresist may be used to allow for an etching process to selectively etch back the thickness of a spacer which was deposited in a single deposition.

In general, in another aspect, the invention features a full-color static graphical image comprising an array of interferometric modulator cavities. Each cavity includes a reflector, and an induced absorber, the induced absorber including a spacer having a thickness that defines a color associated with the cavity.

In general, in another aspect, the invention features a full-color static graphical image comprising separate patterns of spacers or interferometric modulator cavities with spacers, in each pattern the spacer having a thickness which defines a color associated with the pattern which when all patterns are combined produces the image.

Among the advantages of the invention may be one or more of the following. High quality full-color flat panel displays may be made possible by using pixels based on these new cavities. By fabricating a pixel which switches between two colors (for example red and black) then a flat-panel display may be fabricated by combining three sets of these pixels designed to switch between red and black, green and black, and blue and black respectively. The inherent color precludes the need for color filter arrays which are typically required for color LCDs. Additionally reflective displays, which are displays which use ambient light instead of backlighting, are particularly susceptible to pixel inefficiencies. Because the cavities of the invention can use greater than 90% of the incident light, they are excellent candidates for this application. These structures, when driven electrostatically, also exhibit a micro-electromechanical hysteresis which can be exploited to eliminate the need for transistors.

Other advantages and features of the invention will become apparent from the following description and from the claims.

DESCRIPTION

Any thin film, medium, or substrate (which can be considered a thick film) can be defined in terms of a characteristic optical admittance. By considering only the reflectance, the operation of a thin film can be studied by treating it as an admittance transformer. That is, a thin film or combination of thin films (the transformer) can alter the characteristic admittance of another thin film or substrate (the transformed film) upon which it is deposited. In this fashion a normally reflective film or substrate may have its characteristic admittance altered (i.e. transformed) in such a way that its reflectivity is enhanced and/or degraded by the deposition of, or contact with, a transformer. In general there is always reflection at the interface between any combination of films, mediums, or substrates. The closer the admittances of the two, the lower the reflectance at the interface, to the point where the reflectance is zero when the admittances are matched.

Figure 1:
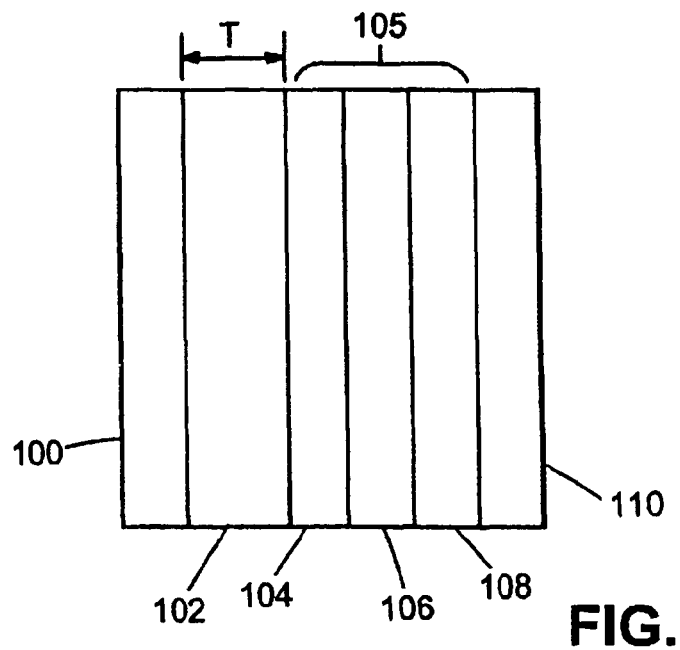
FIG. 1 is a diagram of layers a modulator.

Referring to FIG. 1, reflector 100 (the transformed film) is separated from induced absorber 105 (the transformer), comprising films 104, 106, and 108, by variable thickness spacer 102. Incident medium 110 bounds the other side of induced absorber 105. Each of these thin films is micromachined in a fashion described in the parent patent application. Induced absorber 105 performs two functions. The first is to match the admittances of reflector 100 and incident medium 110. This is accomplished via matching layer 108, which is used to transform the admittance of absorber 106 to that of the incident medium 110, and via matching layer 104, which is used to transform the admittance of reflector 100 to that of absorber 106. The second function is the absorption of light. This is accomplished using absorber 106, which performs the function of attenuating light which is incident upon it through the medium, as well as light which is incident upon it from the reflector.

Figure 2:
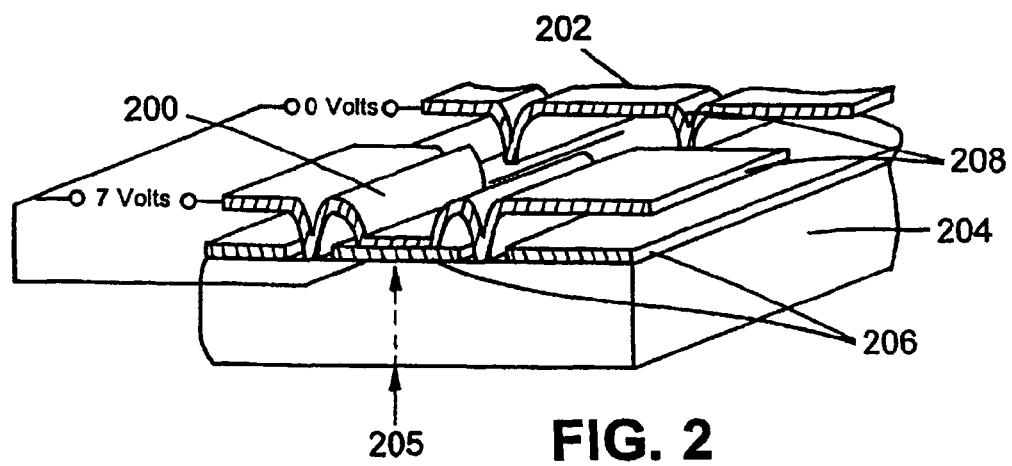
FIG. 2 is a perspective view of cavities in a device.

The ability to alter the thickness T of spacer 102 allows the optical characteristics of the entire structure to be modified. Referring to FIG. 2, pixel 200 is shown in the driven state and pixel 202 in the undriven state. In this case induced absorber 206 (the transformer) resides on substrate 204 and reflector 208 (the transformed film) is a self-supporting structure. Application of a voltage causes reflector 208 to come into contact or close proximity with induced absorber 206. Proper selection of materials and thicknesses will result in a complete transformation of the admittance of reflector 208 to that of substrate 204. Consequently, a range of frequencies of light 205, which is incident through substrate 204, will be significantly absorbed by the pixel. With no voltage applied, reflector 208 returns to its normal structural state which changes the relative admittances of the reflector and the substrate. In this state (pixel 202) the cavity behaves more like a resonant reflector, strongly reflecting certain frequencies while strongly absorbing others.

Figure 3:
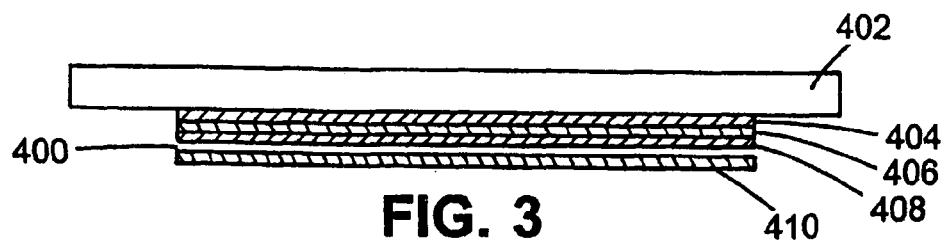
FIG. 3 is a diagram is a side view of a pixel device.
Figure 4:
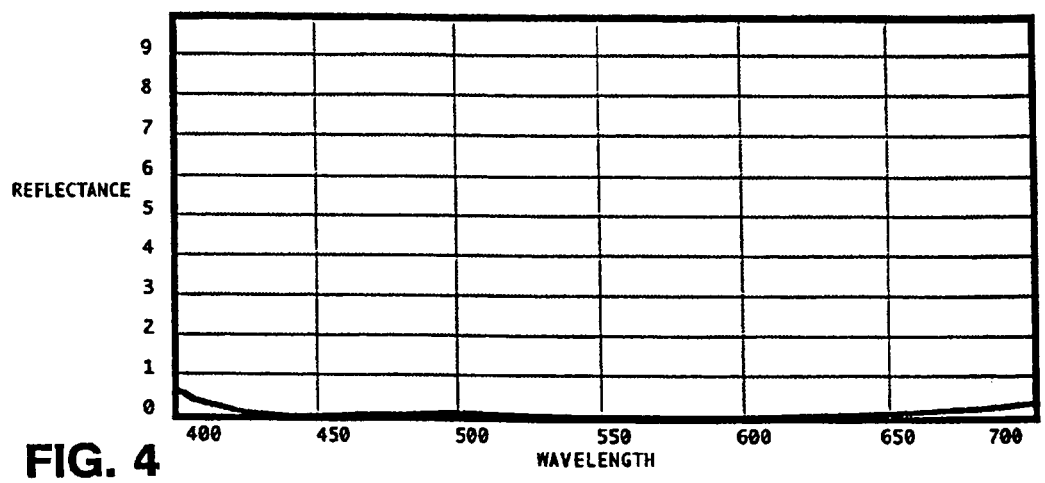
FIG. 4 is a graph of the optical response for a cavity which appears black.
Figure 5:
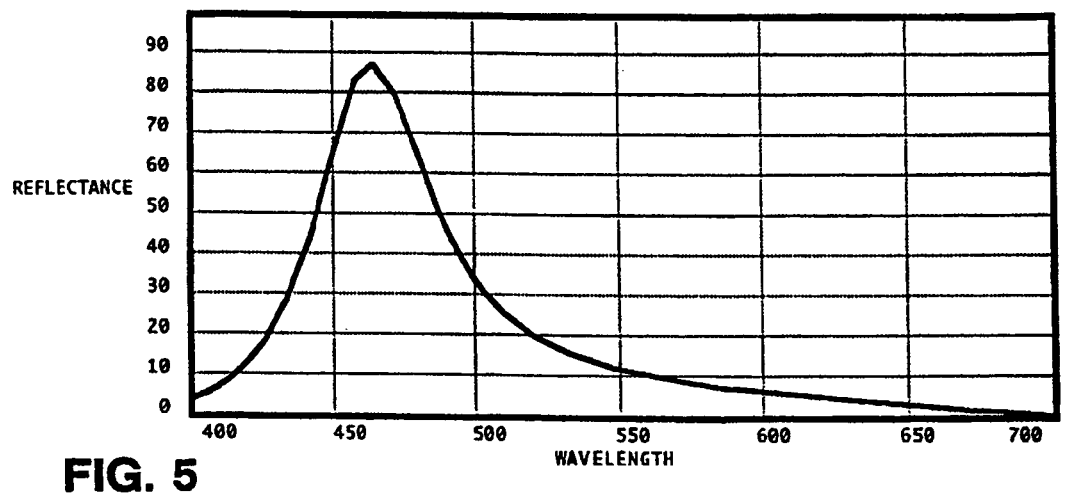
FIG. 5 is a graph of the optical response for a cavity which appears blue.
Figure 6:
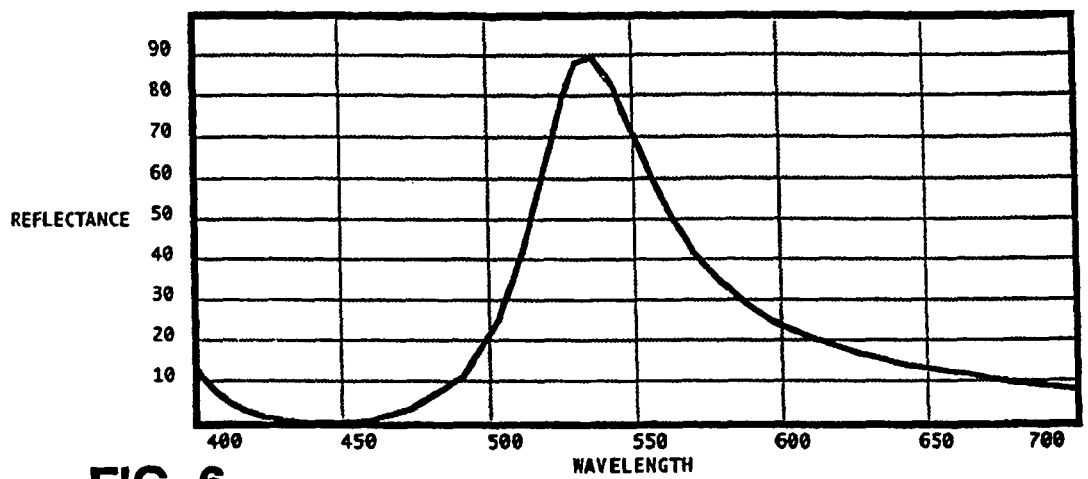
FIG. 6 is a graph of the optical response for a cavity which appears green.
Figure 7:
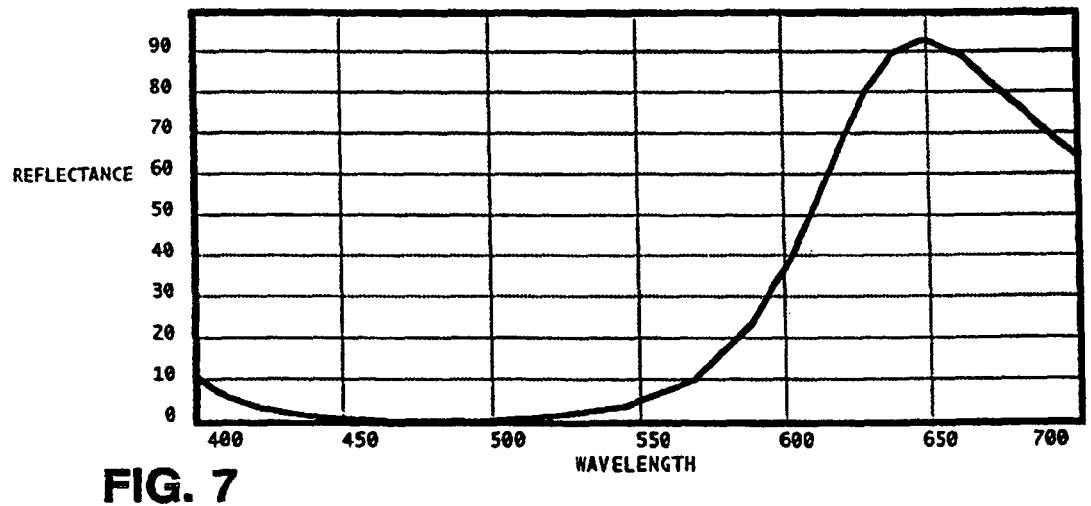
FIG. 7 is a graph of the optical response for a cavity which appears red.
Figure 8:
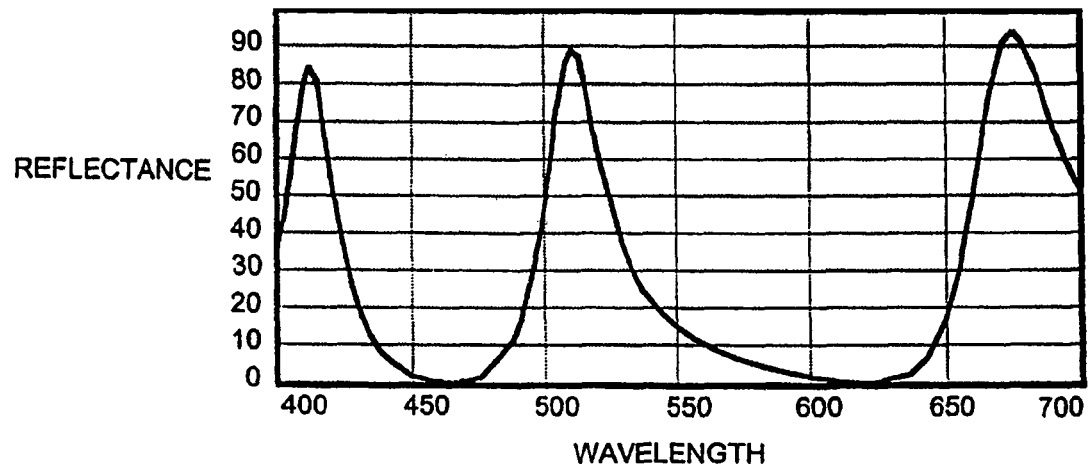
FIG. 8 is a graph of the optical response for a cavity which appears white.
Figure 9:
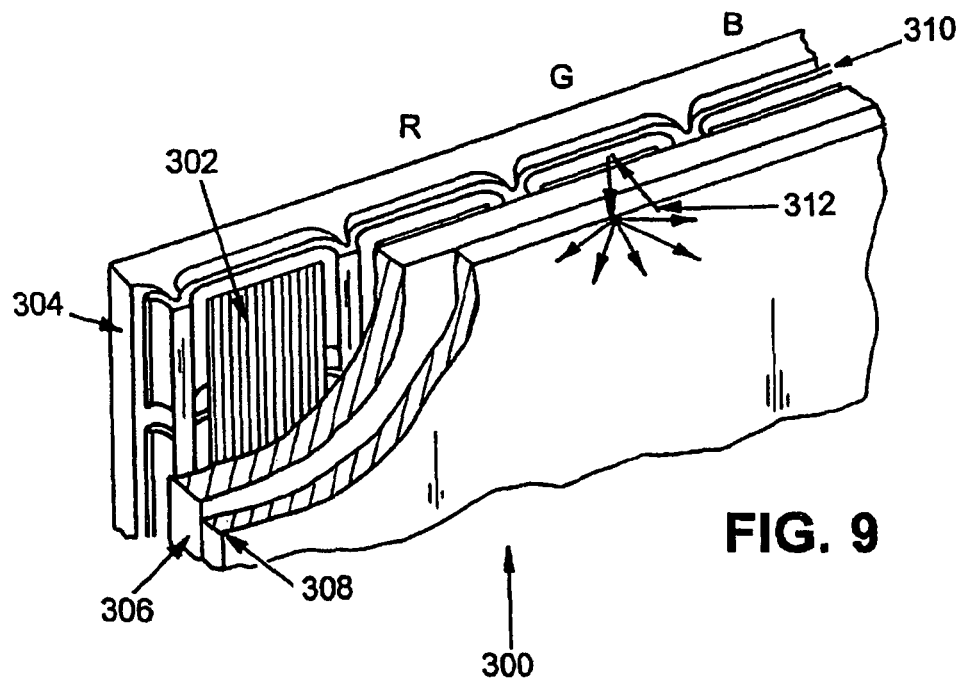
FIG. 9 is a perspective view of a fragment of a reflective flat panel display.

Proper selection of materials thus allows for the fabrication of pixels which can switch from reflecting any color (or combination of colors) to absorbing (e.g., blue to black), or from reflecting any color combination to any other color (e.g., white to red). Referring to FIG. 3, in a specific pixel design, substrate 402 is glass, matching layer 404 is a film of zirconium dioxide which is 54.46 nm thick, absorber 406 is a tungsten film 14.49 nm thick, matching layer 408 is a film of silicon dioxide 50 nm thick, spacer 400 is air, and reflector 410 is a film of silver at least 50 nm thick. Referring to FIG. 4, the optical response of the pixel is shown in the driven state, i.e., when reflector 410 is in contact with matching layer 408 resulting in a broad state of induced absorption. Referring to FIGS. 5-8, the different color pixels are shown in respective undriven states which correspond to the reflection of blue, green, red, and white light, respectively. These responses correspond to undriven spacer thicknesses of 325, 435, 230, and 700 nm respectively Referring to FIG. 9, a section of a full color reflective flat panel display 298 includes three kinds of pixels, R, G, and B. Each kind differs from the others only in the size of the undriven spacer which is determined during manufacture as described in the parent patent application. Induced absorber 300 resides on substrate 304, and reflector 308 is self-supporting. Monolithic backplate 302 provides a hermetic seal and can consist a thick organic or inorganic film. Alternatively, the backplate may consist of a separate piece, such as glass, which has been aligned and bonded to the substrate. Electrodes may reside on this backplate so that the electromechanical performance of the pixels may be modified. Incident light 310 is transmitted through optical compensation mechanism 306 and substrate 304 where it is selectively reflected or absorbed by a pixel. The display may be controlled and driven by circuitry of the kind described in the parent application.

Optical compensation mechanism 306 serves two functions in this display. The first is that of mitigating or eliminating the shift in reflected color with respect to the angle of incidence. This is a characteristic of all interference films and can be compensated for by using films with specifically tailored refractive indices or holographic properties, as well as films containing micro-optics; other ways may also be possible. The second function is to supply a supplemental frontlighting source. In this way, additional light can be added to the front of the display when ambient lighting conditions have significantly diminished thus allowing the display to perform in conditions ranging from intense brightness to total darkness. Such a frontlight could be fabricated using patterned organic emitters or edge lighting source coupled to a micro-optic array within the optical compensation film; other ways may also be possible.

The general process for fabrication of the devices is set forth in the parent application. Additional details of two alternative ways to fabricate spacers with different sizes are as follows; other ways may also be possible.

Both alternative processes involve the iterative deposition and patterning of a sacrificial spacer material which, in the final step of the larger process is, etched away to form an air-gap.

Figure 10A:
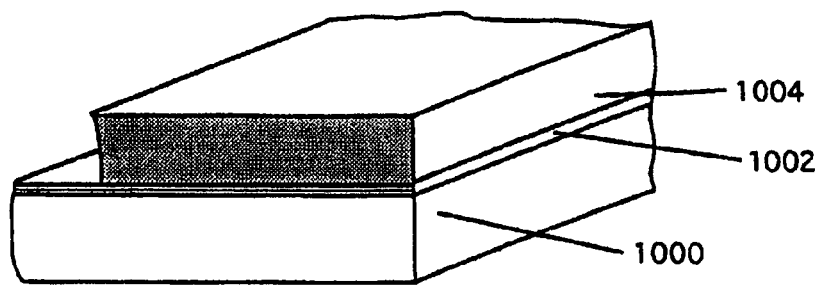
FIGS. 10a, 10b, 10c, 10d are perspective views of different spacers during fabrication.
Figure 10B:
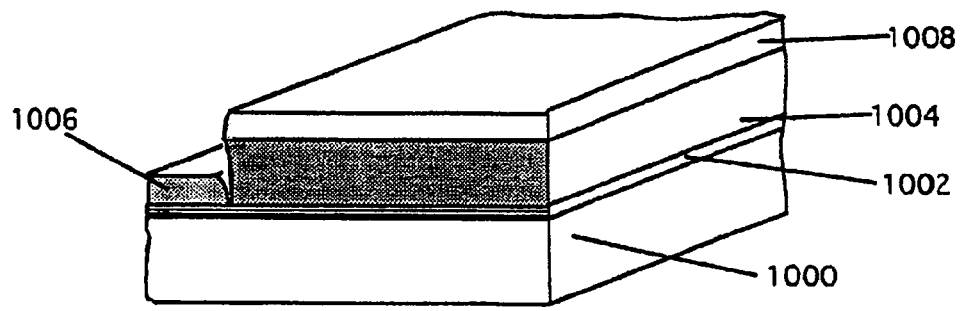
Figure 10C:
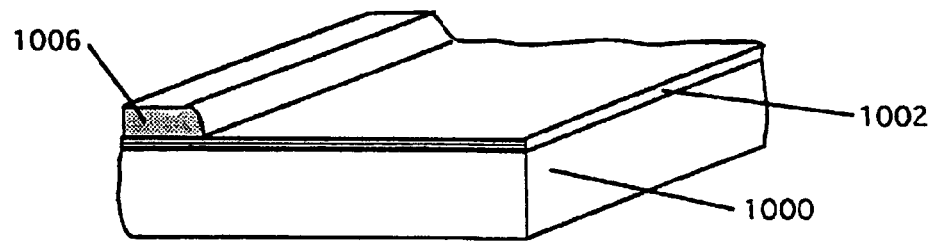
Figure 10D:
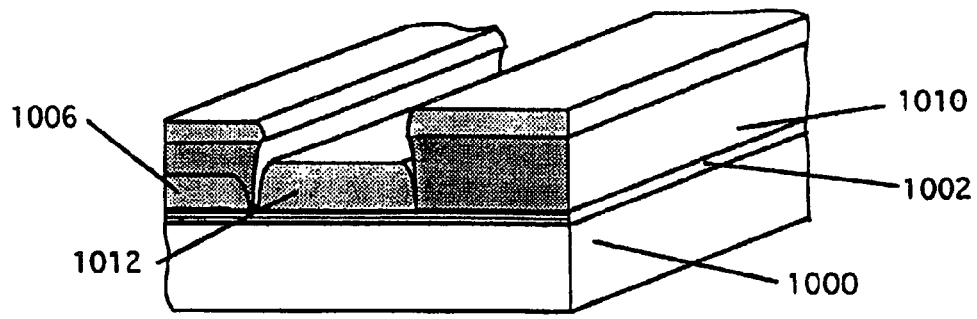

Referring to FIG. 10a, substrate 1000 is shown with induced absorber 1002 already deposited and photoresist 1004 deposited and patterned. Induced absorber 1002 is deposited using any number of techniques for thin film deposition including sputtering and e-beam deposition. The photoresist is deposited via spinning, and patterned by overexposure to produce a natural overhang resulting in a stencil. The result is that it may be used to pattern subsequently deposited materials using a procedure known as lift-off. Referring to FIG. 10b, spacer material 1006 has been deposited, resulting in excess spacer material 1008 on top of the stencil. Referring to FIG. 10c, the stencil along with the excess spacer material have been lifted off by immersing the device in a bath of a solvent such as acetone and agitating it with ultrasound. Referring to FIG. 10d, the process has begun again with new photoresist 1010 having been deposited patterned in a fashion such that new spacer 1012 is deposited adjacent to the old spacer 1006. Repeating the process once more results in spacers with three different thicknesses. Referring to FIG. 10d, the process has begun again with new photoresist 1010 having been deposited patterned in a fashion such that new spacer 1012, with a different thickness, is deposited adjacent to the old spacer 1006.

Figure 11A:
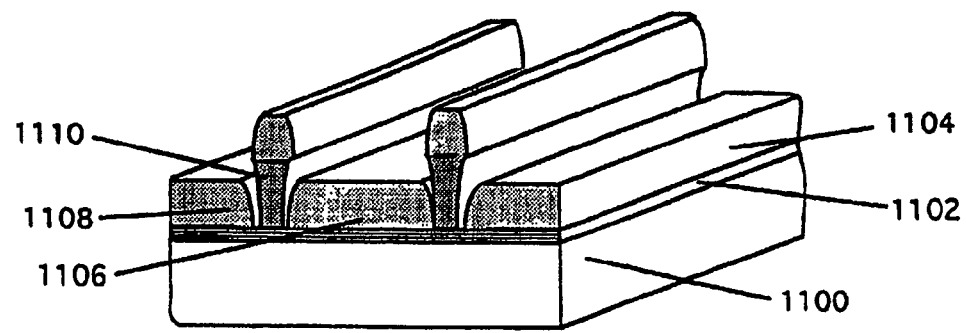
FIGS. 11a, 11b, 11c, 11d are also perspective views of different spacers during fabrication.
Figure 11B:
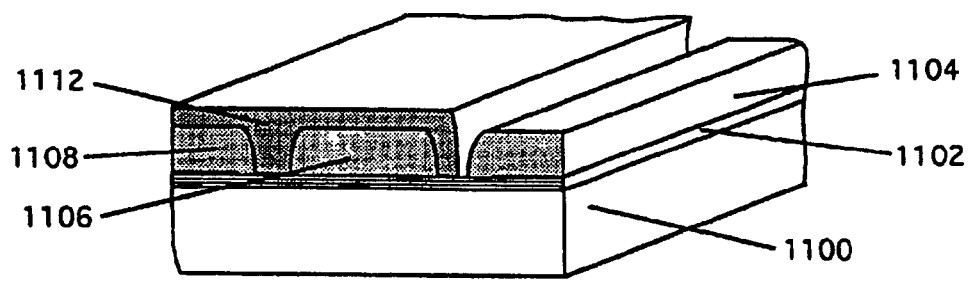
Figure 11C:
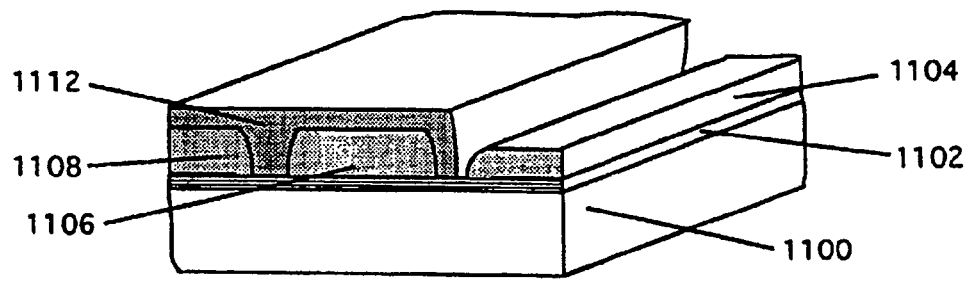
Figure 11D:
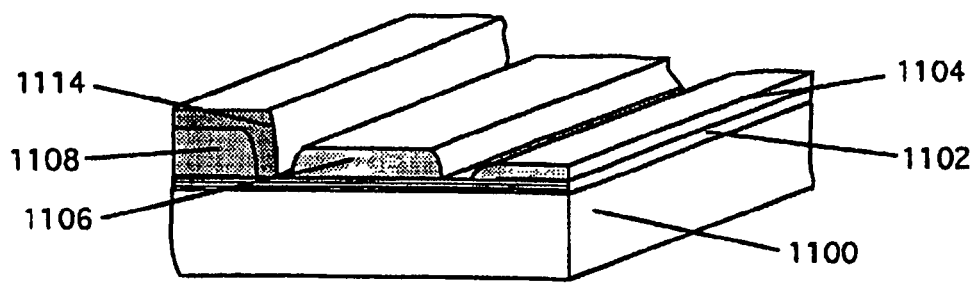

Referring to FIG. 11a, substrate 1000 is shown with induced absorber 1102 already deposited. Spacer materials 1104, 1106, and 1108 have also been deposited and patterned by virtue of lift-off stencil 1110. The spacer materials have a thickness corresponding to the maximum of the three thicknesses required for the pixels. Referring to FIG. 11b, the stencil along with the excess material has been lifted off and new photoresist 1112 has been deposited and patterned such that spacer 1104 has been left exposed. Referring to FIG. 11c, spacer material 1104 has been etched back via one of a number of techniques which include wet chemical etching, and reactive ion etching. Only a portion of the required spacer material is etched away, with the remainder to be etched in a subsequent etch step. Photoresist 1112 is subsequently removed using a similar technique. Referring to FIG. 11d, new photoresist 1114 has been deposited and patterned exposing spacers 1104 and 1106. The entire etch of spacer 1106 is performed in this step, and the etch of spacer 1104 is completed. Photoresist 1114 is subsequently removed and the process is complete.

Other embodiments are within the scope of the following claims.

For example, the spacer material need not ultimately be etched away but may remain instead a part of the finished device. In this fashion, and using the previously described patterning techniques, arbitrary patterns may be fabricated instead of arrays of simple pixels. Full color static graphical images may thus be rendered in a method which is analogous to a conventional printing process. In conventional printing, an image is broken up into color separations which are basically monochrome graphical subsets of the image, which correspond to the different colors represented, i.e., a red separation, a blue separation, a green separation, and a black separation. The full-color image is produced by printing each separation using a different colored ink on the same area.

Alternatively, in a process which we will call "Iridescent Printing", the different separations are composed of layers of thin films which correspond to the IMod design described here and those in the referenced patent. Patterning or printing a combination of colors or separations on the same area, allows for brilliant full-color images to be produced.

Figure 12A:
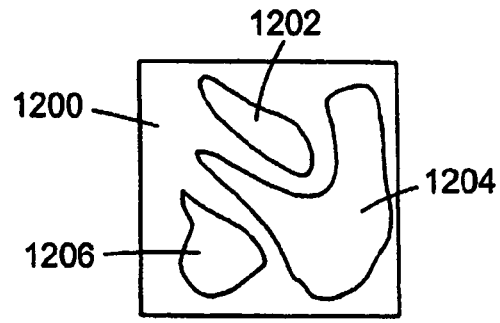
FIGS. 12a, 12b, 12c, 12d are top views of a static graphic image.
Figure 12B:
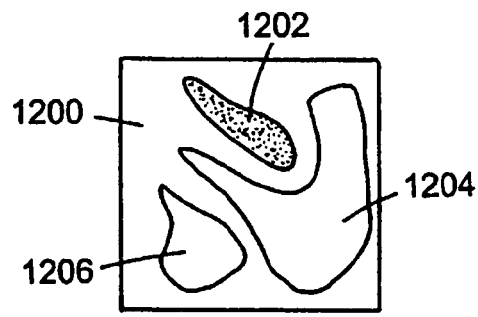
Figure 12C:
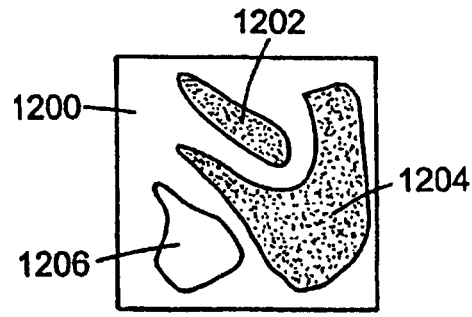
Figure 12D:
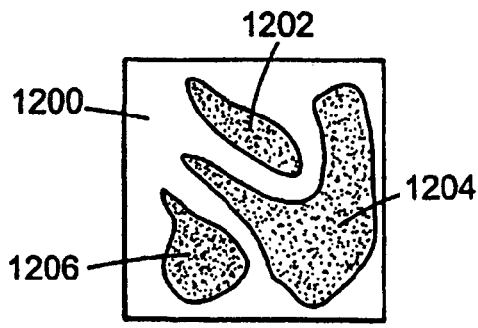

Referring to FIG. 12a, a square substrate is shown with area 1200 representing the portion of the substrate which has been patterned with a thin film stack optimized for black. Referring to FIG. 12b, the substrate has been subsequently patterned with a thin film stack optimized for red in area 1202. Referring to FIG. 12c, the substrate has been subsequently patterned with a thin film stack optimized for green in area 1204. Referring to FIG. 12d, the substrate has been subsequently patterned with a thin film stack optimized for blue in area 1206.

Alternatively, a simpler process can be obtained if only the induced absorber design is used. In this process, the entire substrate is first coated with the induced absorber stack. Subsequent steps are then used to pattern the spacer material only, using the aforementioned techniques. After the desired spacers, i.e., colors are defined, a final deposition of a reflector is performed.

The brightness of different colors can be altered by varying the amount of black interspersed with the particular color i.e. spatial dithering. The images also exhibit the pleasing shift of color with respect to viewing angle known as iridescence.

In another example, a reflective flat panel display may also be fabricated using a single kind of pixel instead of three. Multiple colors, in this case, are obtained through fabricating the pixels in the form of continuously tunable or analog interferometric modulators as described in the parent patent application. In this fashion, any individual pixel may, by the application of the appropriate voltage, be tuned to reflect any specific color. This would require that the array be fabricated on a substrate along with electronic circuitry, or directly on the surface of an integrated circuit, in order to provide a charge storage mechanism. This approach, though it requires a more complicated driving scheme relying on analog voltages, provides superior resolution. It would also find application in a projection system.

Figure 13:
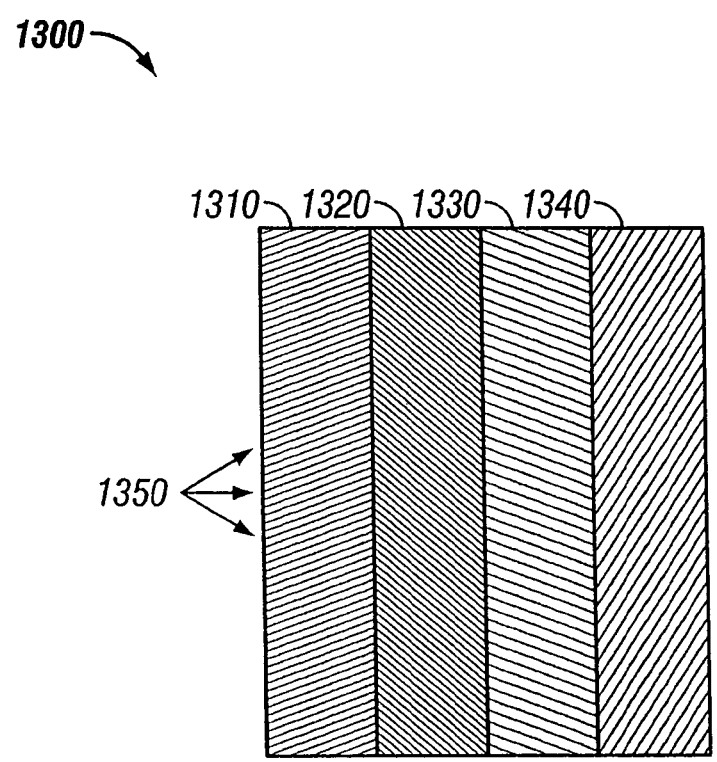
FIG. 13 is a diagram of an exemplary embodiment of a layered display device comprising an optical compensation mechanism and an induced absorber.

Referring to FIG. 13, a diagram of an exemplary display 1300 is illustrated. As shown in this embodiment, the display 1300 comprises a plurality of stacked layers. The display 1300 comprises first layer comprising an optical compensation material or mechanism 1310 located in a front portion of the display 1300. Next to the first layer, a second layer comprising a substrate 1320 (also referred to as an incident medium in some embodiments) is located. Next to the second layer, a third layer comprising an induced absorber 1330 is located. Next to the third layer, a fourth layer comprising a reflector 1340 is located.

The induced absorber 1330 may include a sandwich of an absorber between two matching layers. One of the matching layers may reside at the boundary of the absorber 1330 with the substrate 1320 and the other matching layer may reside at the boundary of the absorber 1330 with the reflector 1340.

The substrate 1320 may also include a transparent incident medium. The induced absorber 1330 and/or the reflector 1340 may reside on the substrate 1320. The substrate 1320 may be transparent, in which case it could also act as the incident medium, or opaque.

The display 1300 may be used in a projection system. An optical compensation mechanism 1310 may be used to mitigate or eliminate a shift in color with respect to viewing angle or to provide supplemental frontlighting or to mitigate or eliminate a shift in color with respect to viewing angle. The substrate 1320 may be an integrated circuit.

In this embodiment, incident light 1350 enters a front portion of the display 1300 and at least a portion of the light 1350 passes through the optical compensation mechanism 1310. After the incident light 1350 passes through the optical compensation mechanism 1310, at least a portion of the light 1350 passes through the substrate 1320. After passing through the substrate 1320, at least a portion of the light 1350 passes through an induced absorber 1330. Accordingly, after the light 1350 passes through the induced absorber 1330, at least a portion of the light 1350 continues on to the reflector 1340. Some of the light 1350 may be reflected by the reflector 1340 and then travel back through the induced absorber 1330, then the substrate 1320, and then the optical compensation mechanism 1310.

Although the embodiment illustrated in FIG. 13 depicts certain elements in a particular configuration, many other configurations are possible that are still within the scope of the invention. For example, in some embodiments the substrate 1320 may not serve as an incident medium. Moreover, other embodiments may not require all of the elements depicted in FIG. 13. For example, in some embodiments, the optical compensation mechanism 1310 or the induced absorber 1330 may not be present.

What is claimed is:

1. A device, comprising:
    a light-absorbing material including a semiconducting film;
    a substrate located above said light-absorbing material;
    a reflector located below said light-absorbing material; and
    an optical resonant cavity, a portion of which is located between said light absorbing material and said reflector, wherein the cavity includes a dielectric film,
    wherein a portion of light incident passing through the substrate is reflected by the reflector towards the light-absorbing material.

2. The device of claim 1, wherein the substrate includes one or more electrodes connected to a circuitry.

3. The device of claim 1, wherein the light-absorbing material further includes a metal film.

4. The device of claim 1, wherein the reflector is movable to alter the thickness of the optical resonant cavity and enable modulation of the light incident passing through the substrate.

5. The device of claim 1, wherein the reflector includes a metal film.

6. The device of claim 5, wherein the reflector includes a film of silver.

7. The device of claim 6, wherein the silver film is at least 50 nm thick.

8. The device of claim 1, wherein the light-absorbing material includes an absorber and one or more layers.

9. The device of claim 8, wherein the one or more layers includes a metal film.

10. The device of claim 8, wherein the one or more layers includes a dielectric film.

11. The device of claim 8, wherein the one or more layers includes the semiconductor film.

12. The device of claim 8, wherein the absorber includes the semiconducting film.

13. The device of claim 12, wherein the one or more layers includes a second semiconducting film.

14. The device of claim 1, wherein the device includes a part of a display array.

* * * * *